United States Patent Office 3,781,384
Patented Dec. 25, 1973

3,781,384
POLYMERIZATION OF ABS RESINS IN THE PRESENCE OF UNSATURATED ALPHA-METHYLSTYRENE DIMERS
Arnold B. Finestone, Leominster, Jack Milgrom, Concord, and Stephen V. Slovenkai, Leominster, Mass., assignors to Foster Grant Co., Inc., Leominster, Mass.
No Drawing. Continuation of abandoned application Ser. No. 850,639, Aug. 15, 1969. This application Jan. 24, 1972, Ser. No. 220,524
Int. Cl. C08f 15/40, 19/02, 19/08
U.S. Cl. 260—879                          16 Claims

ABSTRACT OF THE DISCLOSURE

Solvent resistant polymers having improved surface appearance, and good impact and tensile strengths are prepared by mass polymerizing, until about 2 to 15% of the monomeric components are converted to polymer, a monomeric mixture of at least one monovinyl aromatic compound and at least one unsaturated organonitrile compound, the monomeric mixture having dissolved therein at least one rubbery polymer, adding unsaturated alpha-methylstyrene dimers to the polymerization mixture and completing the polymerization.

BACKGROUND OF THE INVENTION

This is a continuation of application Ser. No. 850,639, filed Aug. 15, 1969, now abandoned.

This invention relates to the preparation of solvent resistant ABS-type polymers which have a smooth, glossy surface appearance and high impact and tensile strengths. More particularly, this invention relates to a process which comprises polymerizing at least one vinyl aromatic compound and at least one unsaturated organonitrile compound in the presence of unsaturated alpha-methylstyrene dimers and at least one rubbery polymer.

The polymers of this invention are generally termed "ABS-type polymers." ABS-type polymers are normally solid copolymerizates of at least one monovinyl aromatic compound and at least one organonitrile compound in admixture, with at least one rubbery polymer present in particulate form. ABS-type polymers have achieved general acceptance for many commercial molding operations, however articles molded from these polymers often do not have a very good surface appearance, apparently partly due to the fact that they contain large particles of rubber and partly because they have poor flow characteristics which makes it very difficult to mold these polymers into smooth-surfaced objects. This is of little consequence when the molded products are intended for use in places which are hidden from the eye, such as in cases where the polymeric product is plated with a metallic coating; however, if the polymer is intended for use in applications where the product surface is visible the usual ABS polymers are often unsatisfactory.

British patent specification No. 1,025,573, which corresponds to copending U.S. patent application Ser. No. 772,820, discloses a method of improving the flow properties of ABS polymers by adding alpha-methylstyrene dimers to the polymerization mixture prior to polymerization or, in the case of a two-stage polymerization consisting of a bulk prepolymerization step followed by an aqueous suspension polymerization step, adding the alpha-methylstyrene dimers to the polymerization mixture either prior to the prepolymerization or at the outset of the suspension polymerization stage. Although the products of this process have improved flow properties, their surface appearance still leaves something to be desired in that they are not smooth and even when molded, apparently due to the formation of very large rubber particles throughout the polymeric composition. These polymers have the further disadvantage that they are not as tough as polymers which were not modified by chain transfer agents during their preparation.

Wehr et al., U.S. Pat. No. 2,646,423, discloses that the addition of unsaturated dimer of alpha-alkylstyrene to a reaction mixture containing resin-producing monomers, e.g. styrene and acrylonitrile, during the polymerization of the mixture will result in the production of a mixture of high and low molecular weight polymer. The compositions of Wehr et al. do not contain a rubbery polymer.

It has now been discovered that the addition of one of the unsaturated dimers of alpha-alkylstyrene, namely, the unsaturated dimers of alpha-methylstyrene, to an ABS polymerizing mixture during a specific period in the course of the polymerization unexpectedly results in the production of a polymer having not only excellent toughness, and good flow properties, but also a superior surface appearance. Microscopic examination of polymers prepared according to this invention reveal that the particle size of the rubbery polymer which is dispersed throughout the resinous polymer is very small and that the particle size of the rubber can be regulated by varying the time of addition of the unsaturated dimers of alpha-methylstyrene to the ABS polymerization system. Because of the present invention, ABS-type polymers can now be prepared which have excellent surface appearance, as well as the flow properties required to fabricate them into usable parts by the use of conventional forming machines and techniques and desirably high tensile and impact strengths.

Accordingly, it is an object of the present invention to present ABS polymers having improved surface appearance, good flow properties and high impact and tensile strengths. It is another object to present a process for preparing ABS polymers having improved surface appearance, good flow properties and high impact and tensile strengths. It is a further object of the invention to present a method of regulating the particle size of the rubbery component in an ABS-type polymer. These and other objects of the invention will become apparent as the description proceeds.

SUMMARY OF THE INVENTION

According to the invention, an ABS polymerization mixture is prepared by dissolving one or more rubbers in a mixture comprising at least one monoalkenyl aromatic monomer and at least one unsaturated organonitrile monomeric compound. Bulk polymerization of the mixture is then initiated, either thermally, or by the use of a suitable polymerization catalyst. After polymerization has proceeded to a point at which about two to about 15% of the monomer is polymerized, a predetermined amount of unsaturated alpha-methylstyrene dimers is added to the mixture and the polymerization is then continued to completion. The polymerization may be completed in bulk or the polymerization mixture may be suspended in an aqueous medium at some point after about 20 to 50% of the monomer present in the mixture has been converted to polymer.

DESCRIPTION OF THE INVENTION

Polymerization of the monomers used in the invention is generally conducted in two stages, the first, or prepolymerization stage being carried out in bulk and the second stage being carried out either in bulk or aqueous suspension. The prepolymerization is preferably thermally initiated by heating the polymerization mixture to a temperature of about 75° to about 120° C. The polymerization mixture is maintained at a temperature within that range until the end of the first stage. The unsaturated alpha-methylstyrene dimers are added to the polymerization mixture during the first stage but addition of the dimers is delayed until about 2 to about 15% of the monomer has been polymerized. The first stage heating cycle preferably consists of a heating period of from about 7 to about 15 hours at a temperature of about 80° to about 110° C. and can be terminated at any point after about 20% of the monomer has been converted to polymer. The optimum first stage termination point will depend upon the properties desired in the finished product. These, in turn, are influenced by such variables as the percentage of rubbery polymer in the reaction mixture and the operating conditions, such as temperature, catalyst concentration, etc. In general it has been found that the first stage is ideally terminated after about 20 to about 50% of the monomer has been converted to polymer with the preferred termination point being after at least about 25% conversion has occurred. During the first stage the reactants are stirred sufficiently to maintain a uniform temperature throughout the polymerization mixture.

The second stage polymerization may be conducted either in bulk or in aqueous suspension, the latter being the preferred method. In the preferred embodiment the prepolymerization is suspended in an aqueous solution containing a suspending agent and any other desired polymerization aids, such as catalysts. etc. The polymerization is continued during the second stage by heating the stirred suspension to a temperature of about 50° to 130° C. and maintaining it at that temperature until polymerization is substantially complete.

In the modification in which the second stage polymerization is carried out in bulk, the polymerization is continued, after completion of the first stage, at a temperature of about 90° to 200° C. until substantially all of the monomeric components are polymerized. This can be accomplished in a sealed vessel without agitation or, if desired, the reaction medium can be agitated sufficiently to provide a uniform temperature throughout the polymerization mixture. In this modification the temperature is progressively increased during the second stage of the polymerization to maintain the mass in a fluid condition. Bulk polymerization of the second stage reaction mixture may also be carried out by continuously passing the polymerizing mass through one or more heated zones which maintain it at the polymerization temperature for a period of time sufficient to substantially polymerize the remaining monomer. Volatile components in the polymerization product may be removed by heating at atmospheric or subatmospheric pressure.

The particular rubbery component used in the invention is not critical and accordingly any rubbery polymer which can be used to prepare ABS-type polymers can be used in the present invention. Typical of the rubbery polymers usable in the invention are the rubbery polymeric derivatives of 1,3-butadiene, such as homopolymers thereof and rubbery copolymers, such as butadiene-styrene, butadiene-acrylonitrile, or butadiene-methacrylonitrile copolymers, rubbery terpolymers, such as butadiene-styrene-acrylonitrile, or butadiene-styrene-methacrylonitrile terpolymers, hot and cold emulsion polybutadienes, stereoregular polybutadienes having a cis content of at least 25% and a vinyl content of less than about 10%, and mixtures of the foregoing. Ather rubbery materials such as natural rubbers, synthetic polyisoprene, etc., may also be used in the invention. The amount of rubbery polymer used to prepare the products of the invention is about 3 to 30%, preferably about 5 to 15%, by weight based on the total weight of monomeric and rubbery components percent in the polymerization mixture.

The monovinyl aromatic compounds which may be used include styrene, alpha-methylstyrene, vinylnaphthalene, and derivatives thereof that are free from nuclear substituents which interfere with the production of the desired ABS-type polymers of this invention. Specific examples of derivatives of such monovinyl aromatic compounds include para-methylstyrene, meta-methylstyrene, para-ethylstyrene, para-isopropylstyrene, ortho-chlorostyrene, para-chlorostyrene, aryl-dimethylstyrene, aryl-dichlorostyrene, para-fluorostyrene, para-bromostyrene, and aryl-methyl - aryl - isopropyl-styrene. The preferred vinyl aromatic compound is styrene.

The unsaturated organonitrile compounds used in the invention may be either acrylonitrile or methacrylonitrile the preferred unsaturated organonitrile being acrylonitrile.

The amounts of monovinyl aromatic and unsaturated organonitrile compounds which may satisfactorily be used in the polymerization mixture vary from about 60% to about 85% for the vinyl aromatic compound and from about 15% to about 40% for the unsaturated organonitrile compound, the percentages being based on the total weight of the two monomeric ingredients. The preferred amounts are those which constitute the azeotropic combination which, when the monomeric components of the polymerization mixture are styrene and acrylonitrile, are about 75 and 25% respectively.

The unsaturated dimers of the alpha-methylstyrene used in the invention are a mixture of the products of dimerization of alpha-methylstyrene. The effective chain regulating components of the dimer mixture are 2,4 - diphenyl-4-methyl-1-pentene and 2,4 - diphenyl-4-methyl-2-pentene. The dimerization product is made up principally of these two compounds, although other products of the dimerization, such as the saturated or cyclic dimers of alpha-methylstyrene, may be present in minor amounts without adversely affecting the molecular weight regulation reactions. It has been found that the size and configuration of the suspended rubbery particles is greatly influenced by the time of addition of the unsaturated dimers to the polymerization mixture. By virtue of this invention it is now possible to consistently prepare ABS-type polymers having any desired average particle size, even less than about 10 microns, and particularly about 1 to 10 microns. As mentioned above, the dimers are added to the polymerizing mass after about 2 to about 15% of the monomer has been converted to polymer. It has been found that the best results are obtained when the dimers are added after about 3 to 12% of the monomer has been polymerized. The effective time of addition within the invention as well as the optimum time of addition of the dimers depends on several variables, including the type and concentration of rubbery polymer added, the particular monomers being used and their relative proportions, the polymerization temperature employed, the catalyst concentration, etc. The amount of unsaturated dimers used in the process can vary from about 0.2 to about 1.0% based on the combined weight of the monomeric and rubbery components present in the reaction mixture, the preferred amount being about 0.25 to 0.70%. All of the dimers may be added in the time specified above or, if desired, some of the dimers can be added at later times during the first or second stage polymerization. In any event at least 0.125%, based on the total weight of monomer and rubbery polymers present, must be added in the period after about 2 to 15% of the monomer has been polymerized. When additional dimers are added after the first stage has been completed and the second stage is by suspension polymerization, the dimers are preferably added before the suspension polymerization is initiated.

When the second stage is conducted by suspension polymerization methods, any of the usual suspending agents, such as polyvinyl alcohol, hydroxyethyl cellulose, ammonium polyacrylate, hydroxy-apatite, bentonite, and the like, may be used alone or in combination. Anionic surface active agents may also be used. Suitable anionic surface active agents include fatty acid surfactants, aromatic carboxylic acid surfactants, aromatic and aliphatic organic sulfates and sulfonates, such as sodium and potassium beta-naphthalene sulfonates, sodium and potassium dodecylbenzene sulfonates, sodium and potassium stearates, sodium and potassium caprolates, sodium and potassium lauryl sulfates, and the like. Any effective small amount of the suspending agents and anionic surfactants may be used, ordinarily about 0.002 to about 0.06% of anionic surfactant, based on the weight of the water in the polymerization mixture, is sufficient.

At least one free-radical catalyst is used in the suspension stage of the polymerization process. The preferred catalysts are monomer soluble and have decomposition ranges suitable for the temperature of the suspension stage. Peroxide catalysts have been found to be particularly suitable. Several classes of peroxide catalysts may be used, such as benzoyl peroxide, chlorobenzoyl peroxide, bromobenzoyl peroxide, fluorobenzoyl peroxide, naphthal peroxide, lauroyl peroxide, myristyl peroxide, stearyl peroxide, di-tertiarybutyl peroxide, hydrogen peroxide, decanoyl peroxide, para-menthane hydroperoxide, tertiarylbutyl peroctoate and the like or combinations thereof. Also, suitable azo catalysts may be used, either alone or in combination with other catalysts. A suitable azo catalyst is azo-bisisobutyronitrile. Any effective amount of catalyst or combination of catalysts may be used; ordinarily from about 0.05 to about 1.5% by weight, based on the total weight of the monomers and rubbery polymers, of catalytic agent is satisfactory.

Minor amounts, e.g., up to about 5%, of other polymerizable vinyl substances may be present in the reaction mixture provided they do not adversely affect the polymerization reaction or prevent the attainment of the desired polymer. Examples of such substances are acrylic, methacrylic and itaconic acid esters, e.g., ethylacrylate, methylmethacrylates, dimethylitaconate, etc. Examples of other vinyl compounds which many be present are acrylonitrile, vinyl chloride, vinylidene chloride, etc.

The invention is further illustrated by the following examples in which parts are by weight, based on the weight of the monomers and rubbery polymers charged.

EXAMPLE 1

A stirred polymerization reactor is swept with nitrogen and charged with a mixture of about 3 parts SBR rubber, a rubbery copolymer containing about 75% butadiene and 25% styrene, about 7 parts polybutadiene rubber having about 98% of its units in the cis 1,4-configuration, about 27 parts of acrylonitrile, about 0.35 part of antioxidant, about 0.50 part of unsaturated alpha-methylstyrene dimers and about 63 parts of styrene monomer and heated to about 70° C. and held at that temperature until all of the rubber is dissolved. The mixture is then heated to about 100° C. and reacted at that temperature for about 15 hours with sufficient stirring to maintain uniformity within the reaction mixture and to effect heat transfer. At this point about 36% of the monomer is converted to polymer. This prepolymer reaction mixture is then cooled and added to an aqueous solution having a pH of approximately 3 and containing about 120 parts of water, about 0.4 part of an electrolyte and about 0.4 part of a suspending agent. The mixture is stirred sufficiently to disperse the prepolymer reaction mixture in the aqueous phase and to maintain the suspension. About 1 part peroxide catalyst is added to the prepolymer reaction mixture and it is then heated to about 75° C. and reacted at that temperature for about 5 hours, after which it is cooled to room temperature and the resulting polymer beads are separated from the aqueous suspension medium and are washed and dried. The beads are extruded, pelletized, and compression molded into specimens suitable for tensile and impact strength testing. Some of the pellets are extruded in ribbon form. The results of the physical tests are discussed below.

EXAMPLE II

A second ABS polymer is prepared in accordance with the procedure of Example I except that the prepolymerization reaction is conducted at about 90° C. and unsaturated alpha-methylstyrene dimers are added to the polymerizing mixture in three increments, the first increment consisting of about 0.25 part and being added when about 7½ percent of the monomer charge is converted to polymer, which occurs about 4 hours after the polymerization is initiated, and the second and third increments consisting of about 0.15 part each and being added at monomer conversions of about 16% and 24%, occurring about eight and eleven hours respectively after the polymerization is initiated. Samples are prepared and evaluated for physical properties and the results are discussed below.

The plaque molded from the polymer prepared in Example I contains flow lines and has a heterogeneous appearance while that molded from the Example II polymer has no flow lines and has a homogeneous appearance. A ribbon extruded from the Example I polymer has a dull, rough surface while one extruded from the Example II polymer is smooth and glossy. Samples molded from the polymer of Example I have an Izod impact strength of 2.20 ft. lbs. per inch of notch and a tensile strength at yield of 5,000 p.s.i.g. while those molded from the polymer of Example II have an Izol impact value of 2.56 ft. lbs. per inch of notch and a tensile strength at yield of 5,722 p.s.i.g. In determining the Izod impact and tensile strengths of the samples prepared in each example the procedures of ASTM D–256–56T and ASTM D–638–64T respectively, are followed. Microscopic examination of the products of Examples I and II reveal that the average rubbery polymer particle sizes dispersed throughout these products are about 10 to 50 microns and 1–10 microns respectively.

The foregoing results prove that the particle size of the rubbery particles in an ABS polymer are smaller and the visual properties are improved when unsaturated alpha-methylstyrene dimers are added at a specific time during the polymerization than they are when the dimers are added to the system prior to polymerization.

What is claimed is:

1. A process for preparing ABS-type polymers having improved physical properties comprising:
   (a) mass polymerizing a mixture containing at least one monomeric mono-vinyl aromatic compound, at least one unsaturated monomeric organonitrile selected from the class consisting of acrylonitrile and methacrylonitrile, and at least one rubbery polymer;
   (b) adding 0.20 to 1.0%, based on the combined weight of monomer and rubbery components in the mixture, of unsaturated alpha-methylstyrene dimers to the polymerization mixture during the polymerization at least 0.125% of which is added when about 2 to 15% by weight of the monomer has been converted to polymer and the remainder is subsequently added in one or more increments; and
   (c) continuing the mass polymerization until substantially all of the monomer has been polymerized.

2. A process according to claim 1 wherein all of the unsaturated alpha-methylstyrene dimers are added to the polymerization mixture when about 2 to 15% by weight of the monomer has been converted to polymer.

3. A process according to claim 2 wherein the unsaturated alpha-methylstyrene dimers are added to the polymerization mixture when about 3 to 12% by weight of the monomer has been converted to polymer.

4. A process according to claim 2 wherein the mass polymerization is carried out in two stages, the first stage being conducted at a temperatre of about 70 to 110° C. and the second stage being conducted at a temperature of about 90 to 200° C.

5. A process according to claim 2 wherein the total amount of unsaturated alpha-methylstyrene dimers added to the polymerization mixture is about 0.25 to 0.70%.

6. A process for preparing ABS-type polymers having improved physical properties comprising:
 (a) mass polymerizing a mixture containing at least one monomeric mono-vinyl aromatic compound, at least one unsaturated monomeric organonitrile compound selected from the class consisting of acrylonitrile and methacrylonitrile, and at least one rubbery polymer;
 (b) adding 0.20 to 1.0%, based on the combined weight of monomer and rubbery components in the mixture, of unsaturated alpha-methylstyrene dimers to the polymerization mixture during the polymerization, at least 0.125% of which is added when about 2 to 15% by weight of the monomer has been converted to polymer and the remainder is subsequently added in one or more increments;
 (c) continuing the mass prepolymerization until about 20 to about 50% of the monomer has been converted to polymer;
 (d) suspending the resulting prepolymerization mixture in an aqueous solution containing a suspending agent; and
 (e) polymerizing the mixture at a temperature of about 75 to about 130° C. until substantially all of the monomer has been polymerized.

7. A process according to claim 6 wherein the mass prepolymerization is continued until at least 25% of the monomers have been converted to polymer.

8. A process according to claim 6 wherein all of the unsaturated alpha-methylstyrene dimers are added to the prepolymerization mixture when about 2 to 15% by weight of the monomer has been converted to polymer.

9. A process according to claim 8 wherein the unsaturated alpha-methylstyrene dimers are added to the polymerization mixture when about 3 to 12% by weight of the monomer has been converted to polymer.

10. A process according to claim 8 wherein the total amount of unsaturated alpha-methylstyrene dimers added to the polymerization mixture is about 0.25 to 0.70%.

11. A process according to claim 6 wherein about 0.05 to 1.5%, based on the total weight of the monomeric and rubbery polymer components, of a polymerization catalyst is added to the aqueous suspension.

12. A process according to claim 10 wherein the monomeric mono-vinyl aromatic compound and the unsaturated monomeric organonitrile compound are present in an amount of about 60 to 85% and about 15 to 40% respectively, based on the total weight of monomeric components, and the rubbery polymer is present in an amount of about 3 to 30% based on the total weight of monomeric and rubbery polymer components.

13. A process according to claim 12 wherein the monomeric mono-vinyl aromatic compound is styrene, the unsaturated monomeric organonitrile compound is acrylonitrile and the rubbery polymer is present in an amount of about 5 to 15%, based on the total weight of monomeric and rubbery polymer components.

14. A process according to claim 13 wherein the rubbery polymer is a polybutadiene having substantially all of its units in the cis-1,4 configuration.

15. A process for producing ABS-type polymer having improved physical properties the rubbery polymer component of which is uniformly dispersed throughout the polymeric composition and which has a particle size of about 1 to 10 microns comprising:
 (a) dissolving at least one rubbery polymer in a mixture of styrene and acrylonitrile monomers;
 (b) prepolymerizing the rubbery polymer-monomer solution by mass polymerization until about 20 to about 50% by weight of the monomer has been converted to polymer;
 (c) adding to the polymerizing mixture, when about 2 to 15% of the monomer has been polymerized, about 0.25 to about 0.70%, based on the total weight of monomer and rubbery polymer present in the mixture of unsaturated alpha-methylstyrene dimers;
 (d) dispersing the prepolymer mixture in an aqueous solution containing a suspending agent; and
 (e) polymerizing the suspended prepolymer mixture until substantially all of the monomer has been polymerized.

16. A process according to claim 15 wherein the unsaturated alpha-methylstyrene dimers are added to the polymerizing mixture when about 3 to 12% by weight of the monomer has been polymerized.

References Cited
UNITED STATES PATENTS

| | | | |
|---|---|---|---|
| 3,373,227 | 3/1968 | Finestone et al. | 260—880 |
| 3,428,712 | 2/1969 | Carrock et al. | 260—880 |

JOSEPH L. SCHOFER, Primary Examiner

W. F. HAMROCK, Assistant Examiner

U.S. Cl. X.R.
260—880, 95

UNITED STATES PATENT OFFICE
CERTIFICATE OF CORRECTION

Patent No. 3,781,384                    Dated December 25, 1973

Inventor(s) Arnold B. Finestone, Jack Milgrom and Stephen V. Slovenkai

It is certified that error appears in the above-identified patent and that said Letters Patent are hereby corrected as shown below:

Column 3, line 66, change "Ather" to read "Other".

Column 3, line 72, change "percent" to read "present".

Column 5, line 38, change the phrase "based on the weight" to read "based on the total weight".

Column 6, line 24, change "Izol" to read "Izod"

Column 6, line 70, change "temperatre" to read "temperature".

Signed and sealed this 23rd day of April 1974.

(SEAL)
Attest:

EDWARD M. FLETCHER, JR.
Attesting Officer

C. MARSHALL DANN
Commissioner of Patents